United States Patent [19]

Mizuno et al.

[11] Patent Number: 4,479,046
[45] Date of Patent: Oct. 23, 1984

[54] SINGLE POWER SOURCE ARC WELDING APPARATUS

[75] Inventors: Masanori Mizuno; Takaji Mizuno, both of Nagoya, Japan

[73] Assignee: Mitsubishi Denki Kabushiki Kaisha, Tokyo, Japan

[21] Appl. No.: 483,306

[22] Filed: Apr. 8, 1983

[30] Foreign Application Priority Data

Apr. 14, 1982 [JP] Japan .................................. 57-61874

[51] Int. Cl.³ .............................................. B23K 9/09
[52] U.S. Cl. ............................ 219/130.32; 219/130.51
[58] Field of Search ...................... 219/130.31, 130.32, 219/130.33, 130.51, 137 PS

[56] References Cited

U.S. PATENT DOCUMENTS 4,301,355 11/1981 Kimbrough et al. .......... 219/130.33
4,349,720 9/1982 Mäklmaa ........................ 219/130.33

Primary Examiner—C. C. Shaw
Attorney, Agent, or Firm—Sughrue, Mion, Zinn, Macpeak and Seas

[57] ABSTRACT

A pulse arc welding apparatus in which pulse current and base current are alternately supplied a welding unit 13 comprises a series circuit of a transistor 2, a reactor 3 and a current detector 4 connected between a single power source 1 and the welding unit, and a control circuit 20 for switching the transistor on and off in response to inputs from the current detector, pulse current upper and lower limiters 7, 8, and base current upper and lower limiters 21, 22.

6 Claims, 6 Drawing Figures

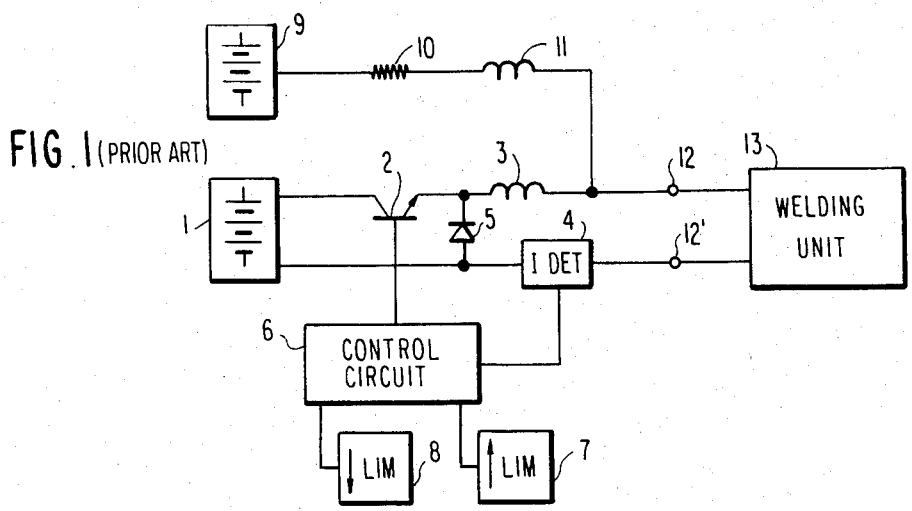
FIG. 1 (PRIOR ART)
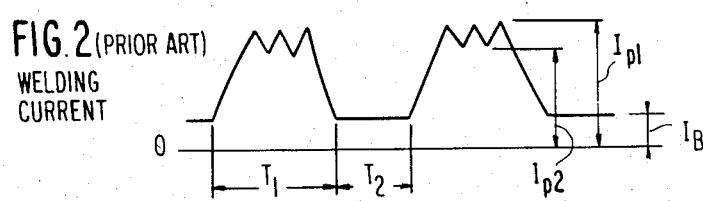
FIG. 2 (PRIOR ART)
WELDING CURRENT
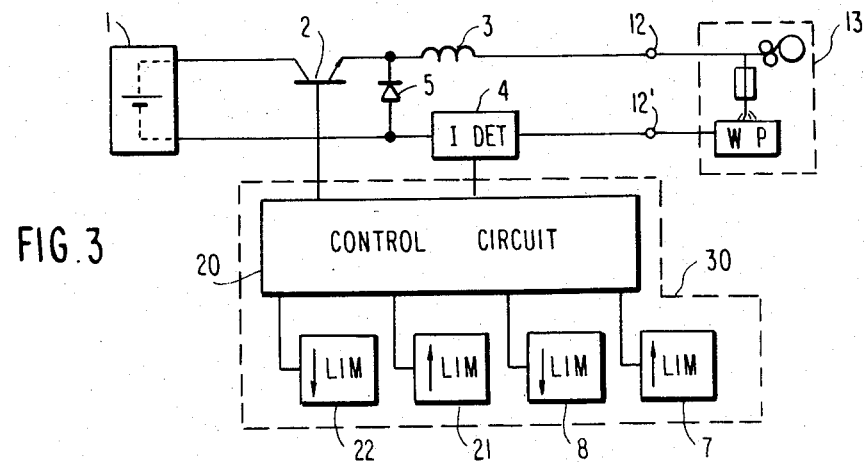
FIG. 3
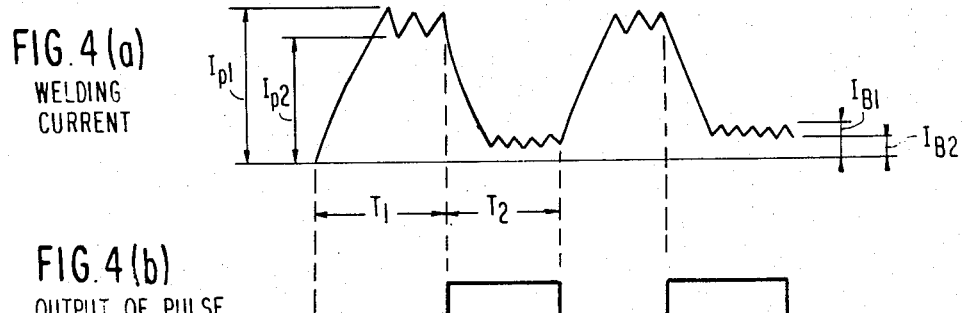
FIG. 4(a)
WELDING CURRENT
FIG. 4(b)
OUTPUT OF PULSE GENERATOR 36

SINGLE POWER SOURCE ARC WELDING APPARATUS

BACKGROUND OF THE INVENTION

This invention relates to an improved pulse arc welding apparatus in which a peak current and a base current are alternately provided to a welding unit.

Pulse arc welding apparatuses are widely known, as exemplified by that disclosed in commonly assigned application Ser. No. 247,451 filed on Mar. 25, 1981.

Referring to FIG. 1, which illustrates a typical conventional pulse are welding apparatus, a first D.C. voltage source 1 has a switching element 2, such as a transistor, connected to one of its output terminals. A first reactor 3 is connected between the transistor and a welding unit 13 through the input terminal 12. A current detector 4 is connected between another output terminal of the source 1 and input terminal 12', and detects the welding current in the unit 13 to operate a control circuit 6. The control circuit also receives set signals from upper and lower peak current limiters 7, 8, and in response to these inputs develops on-off switching signals for the transistor to thereby supply peak current pulses to the welding unit. A second D.C. voltage source 9 supplies a base current to the welding unit 13 through a resistor 10 and a second reactor 11.

Referring to the welding current waveform illustrated in FIG. 2, during peak current period $T_1$ the transistor 2 is turned on to supply a peak current pulse from the source 1 to the welding unit 13 through the transistor and the reactor 3, and this peak current is always sensed by the current detector 4 and monitored by the control circuit 6. When the monitored current value reaches the setpoint $I_{p1}$ of the upper limiter 7 the control circuit outputs a signal which turns off the transistor, whereafter the electromagnetic energy stored in the reactor 3 is dissipated through the path including the reactor, the welding unit 13, the current detector 4 and the diode 5, and the peak current is gradually decreased. When the monitored current value reaches the setpoint $I_{p2}$ of the lower limiter 8, the control circuit 6 outputs a signal which turns on the transistor 2, whereby the peak current is increased again and such cyclic operations are repeated during the period $T_1$. The peak current supplied to the welding unit 13 during $T_1$ will thus be within the two values pre-set by the upper and lower peak current limiters 7, 8.

In the subsequent base current period $T_2$ when the transistor 2 is held off, a base current much lower than the peak current is supplied to the welding unit 13 from the second D.C source 9 through the resistor 10 and the second reactor 11.

The second reactor 11 is essential to stabilize the welding performance by sustaining the arc during abrupt fluctuations in the load current. Furthermore, the greater the difference between $I_{p1}$ and $I_{p2}$ the lower the switching frequency of the transistor 2, and vice versa; a high switching frequency results in losses in and damage to the transistor caused by the abnormal heat generated. Consequently, the switching frequency should usually be less than 2 KHz.

Also, in this conventional pulse arc welding apparatus two D.C. voltage sources 1 and 9, the resistor 10 and two reactors 3 and 11 are required, and hence the cost of the apparatus is high and its physical size is unduly large. Although it has been proposed to use the first D.C. source 1 to supply both the peak and base currents, this has the disadvantage that a considerably large capacity resistor 10 is required which causes substantial heat loss and unfavorably affects the operation of the welding unit.

SUMMARY OF THE INVENTION

It is an object of the present invention to provide a pulse arc welding apparatus which is simple in construction, which has a reduced manufacturing cost, and which produces high quality welds in a stable operational manner.

The foregoing and other objects of the invention are attained by providing a pulse arc welding apparatus comprising a series circuit of a switching means, a reactor and a current detector between a single power source and a welding unit, and a control circuit for controlling the switching means in cooperation with the current detector, peak current upper and lower limiters, and base current upper and lower limiters.

BRIEF DESCRIPTION OF THE DRAWINGS

FIG. 1 is a simplified circuit diagram of a conventional pulse arc welding apparatus, FIG. 2 shows a welding current waveform produced by the apparatus of FIG. 1, FIG. 3 is a simplified circuit diagram of a pulse arc welding apparatus of the present invention, FIG. 4(a) shows a welding current waveform produced by the apparatus of FIG. 3, FIG. 4(b) shows a pulse signal produced by the apparatus of FIG. 3

DETAILED DESCRIPTION OF THE PREFERRED EMBODIMENT

Figure 5:
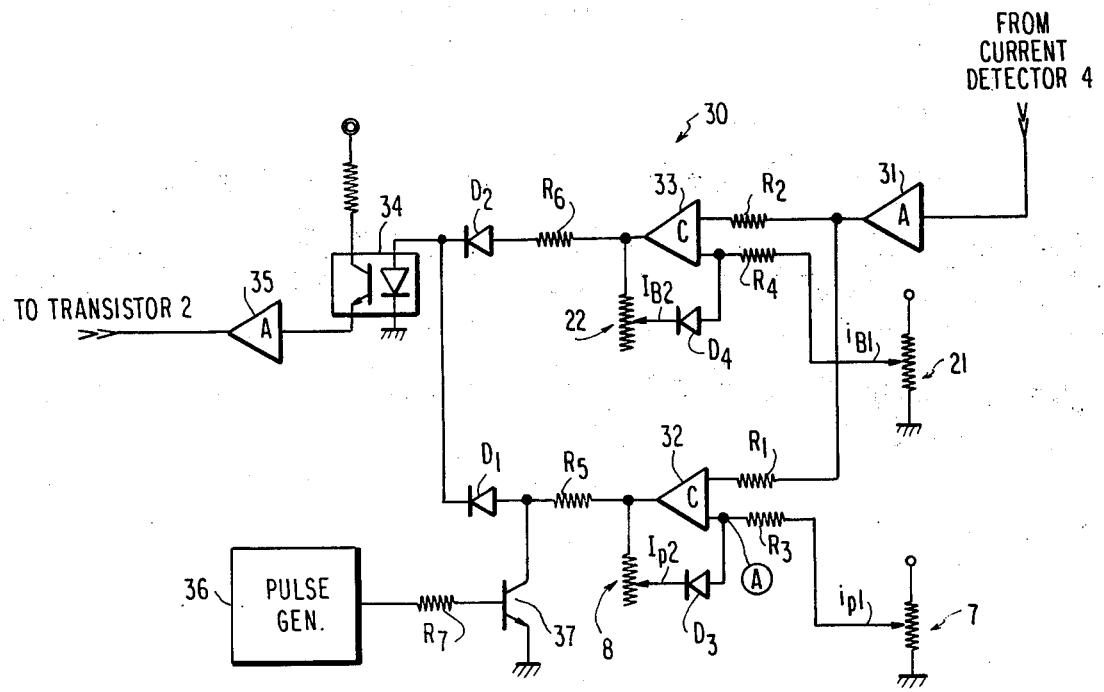
FIG. 5 is a more detailed circuit diagram of the control unit of FIG. 3.

In accordance with the present invention as shown in FIG. 3, a single D.C. voltage source 1 is provided to supply current to a welding unit 13 through a transistor 2, a reactor 3 and a current detector 4. A control circuit receives input signals from the current detector 4 and upper and lower peak current limiters 7, 8 just as in FIG. 1, and in addition from upper and lower base current limiters 21, 22, and in response generates on-off switching signals for the transistor 2. Reference numeral 30 designates a control unit comprising the control circuit 20, the peak current limiters 7, 8, and the base current limiters 21, 22.

FIG. 5 shows a detailed circuit diagram of the control unit 30, wherein a current signal from the current detector 4 is amplified by an amplifier 31 and transmitted to comparators 32, 33 through resistor $R_1$, $R_2$ respectively. The comparators also receive set signals $I_{p1}$ and $I_{B1}$ established by the peak current upper limiter 7 and the base current upper limiter 21 through resistors $R_3$ and $R_4$, respectively. The comparators 32, 33 are individually adjusted so that their outputs are in an off state or down when the current signal from the detector 4 exceeds the set signals from the limiters 7 and 21, and vice versa.

In the on state of the comparators current flows to a photocoupler 34 through a resistor $R_5$ and a diode $D_1$, or through a resistor $R_6$ and a diode $D_2$. The output signal from the photocoupler is amplified by an amplifier 35 and then fed to the base electrode of the transistor 2.

A pulse generator 36 generates an output signal as shown in FIG. 4(b) for establishing the frequency and width of the peak current time periods $T_1$, which inherently establishes the corresponding parameters for the base current time periods $T_2$. The output signal from the pulse generator is supplied to a grounding transistor 37 through a resistor $R_7$.

Referring to FIG. 4, the operation of the circuit shown in FIG. 5 is as follows. In the peak current period $T_1$ the transistor 37 is off, and the output from the comparator 32 is thus directly fed to the photocoupler 34. Also, since the setpoint $I_{p1}$ of the upper limiter 7 is larger than the setpoint $I_{B1}$ of the upper limiter 21, the output from the comparator 33 is always off or down during the $T_1$ periods.

When the signal from the current detector 4 is smaller than the setpoint $I_{p1}$ of the upper limiter 7, the output of the comparator 32 is on or up, and as a result the transistor 2 is switched on to increase the welding current as aforementioned.

When the signal from the current detector, in the course of time, rises above the setpoint $I_{p1}$, the comparator 32 becomes inoperative, and as a result the transistor 2 is cut off to gradually (because of the reactor 3) decrease the welding current. During this time, since the output voltage of the comparator 32 is lower than its on-state output (normally 0 V), the set voltage at the input terminal (point A) of the comparator is reduced by the effect of the peak current lower limiter 8 to $I_{p2}$. A diode $D_3$ prevents interference between the set values of the upper and lower peak current limiters 7, 8. That is, when the comparator 32 is on its output is high, and diode $D_3$ thus blocks any influence of the lower limiter 8 on the comparator input.

When the signal from the current detector 4 falls below the setpoint $I_{p2}$ the comparator 32 becomes operative, and the transistor 2 becomes conductive again to gradually increase the welding current. As a result, the output voltage of the comparator 32 starts to rise, and the set voltage at the input terminal (point A) of the comparator is restored to the set-point $I_{p1}$. The welding current thus cycles up and down repeatedly in this manner between the setpoints $I_{p1}$ and $I_{p2}$ during each peak current period $T_1$.

During the base current period $T_2$ the transistor 37 is turned on to ground the output from the comparator 32, whereby the transistor 2 is switched on and off in accordance with the output of the comparator 33 in the same manner described above for the operation during the pulse current period $T_1$. The welding current thus cycles up and down repeatedly between the setpoints $I_{B1}$ of the upper limiter 21 and $I_{B2}$ of the lower limiter 22 as shown in FIG. 4.

Diodes $D_1$ and $D_2$ prevent any interference between the setpoint values of the comparators.

In a pulse arc welding apparatus of this type the base current magnitude is generally much lower than that of the pulse current, ex. less than 50 A. Consequently, and according to this invention, even though the transistor 2 is switched at a relatively high frequency during the base current periods, the heat generated and the attendant switching losses are kept at a low level.

Substantially the same welding performance as with the prior system shown in FIG. 2 is achieved by this invention because of the small difference between the upper and lower limits of the base current as compared with the difference between the upper and lower limits of the peak current.

As described above, in accordance with the present invention the manufacturing cost of the welding apparatus is reduced and its physical size is minimized since it utilizes just one switching means, one power source and one reactor to provide both the peak current and the base current.

Although the switching means is constituted by a transistor in FIG. 3, this could be replaced by a plurality of transistors connected in parallel with each other according to the value of the welding current, or by a Darlington pair.

What is claimed is:

1. A pulse arc welding apparatus, comprising:
   (a) a D.C. voltage source (1),
   (b) switching means (2) for coupling said source to a welding unit (13),
   (c) a current detector (4) for detecting welding current supplied by said source, and
   (d) a control unit (30) comprising an adjustable peak current upper limiter (7), an adjustable peak current lower limiter (8), an adjustable base current upper limiter (21), an adjustable base current lower limiter (22), and a control circuit (20) for generating signals for controlling said switching means to alternately supply peak current and base current pulses to said welding unit, said control circuit comprising a first base current comparator (33) and a second peak current comparator (32), means coupling said current detector output to a first input of each comparator, means coupling outputs of said base current upper and lower limiters to a second input of said first comparator, and means coupling outputs of said peak current upper and lower limiters to a second input of said second comparator, whereby each peak current pulse of the resultant welding current cyclically varies between amplitude levels established by said peak current upper and lower limiters, and each base current pulse similarly varies between amplitude levels established by said base current upper and lower limiters.

2. An apparatus according to claim 1, including means for establishing a setpoint $I_{p1}$ of the peak current upper limiter at a higher value than a setpoint $I_{B1}$ of the base current upper limiter.

3. An apparatus according to claim 1, including setpoint establishing means wherein the difference between setpoints of the upper and lower base current limiters is smaller than the difference between setpoints of the upper and lower peak current limiters.

4. An apparatus according to claim 2, wherein diode isolated outputs of said comparators are coupled in common to said switching means.

5. An apparatus according to claim 4, wherein said comparator outputs are coupled to said switching means through a photocoupler (34).

6. An apparatus according to claim 4, further comprising means (36, 37) for periodically rendering the second comparator output inoperative.

* * * * *